May 23, 1933.  E. ALTENKIRCH  1,910,224
ABSORPTION MACHINE
Filed Nov. 25, 1930
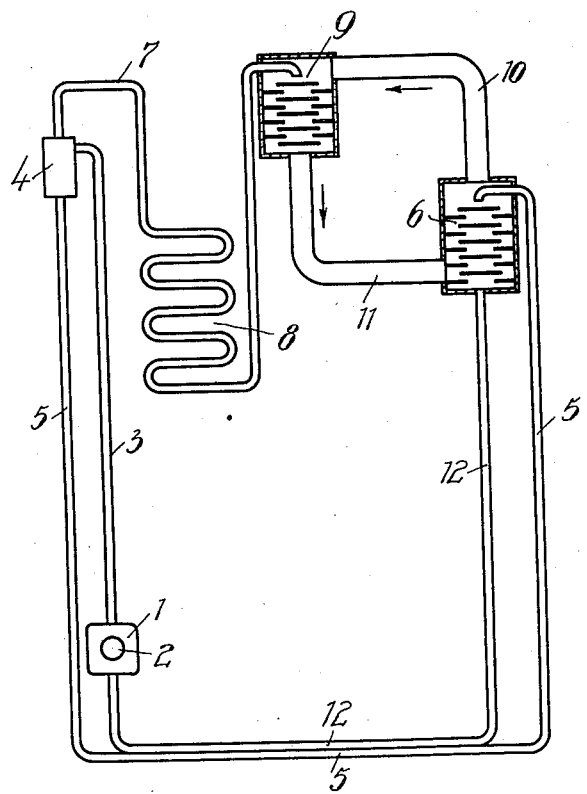

Patented May 23, 1933

1,910,224

UNITED STATES PATENT OFFICE

EDMUND ALTENKIRCH, OF NEUENHAGEN NEAR BERLIN, GERMANY, ASSIGNOR, BY MESNE ASSIGNMENTS, TO THE HOOVER COMPANY, OF NORTH CANTON, OHIO, A CORPORATION OF OHIO

ABSORPTION MACHINE

Application filed November 25, 1930, Serial No. 498,011, and in Germany December 6, 1929.

My invention relates to improvements in absorption machines and more particularly to a binary mixture for absorption refrigerating machines.

Among the binary mixtures coming into consideration as an absorption solution for refrigerating machines, there are but a few which possess such a low vapor pressure that the liquid columns employed to maintain the difference in pressure between the evaporator and the condenser and between the absorber and the generator, do not exceed the permissible height to permit a low height of construction of the refrigerating machine, and which at the same time have a sufficiently low solidifying point for the components as well as for the mixture and do not besides attack metals.

To compose a binary mixture having all the above mentioned properties according to my invention, toluene (formerly called toluol) is employed as a working medium and paraffin oil as a solven. The solidifying point of both media and of their mixture is far below the lowest temperature coming into consideration for most refrigerating machines and particularly for household refrigerators. The boiling point of pure paraffin oil and of weakly concentrated solutions of toluene and paraffin oil is also at the occurring condensing and evaporating pressures very considerably higher than the boiling point of pure toluene. Such an absorption solution is therefore quite particularly suitable for absorption machines in which the condenser and the absorber are exclusively cooled by the surrounding air.

The media mix well with, and dissolve well in, each other in every proportion, and the mixture does not attack iron nor any other metal. Up to temperatures of the cooling air of 40° C., the condensing pressure is less than 1 m water gage absolute. For this reason a moderate height of the refrigerating machine is obtained, which is an important advantage, particularly for small machines.

Should it be desirable—for instance in order to reduce the height of the machine still more—to equalize a part of the difference of pressure by admixing a neutral gas, the employment of an absorption solution according to my invention has the advantage that the partial pressure of the admixed gas, as compared with to the condensing pressure of the working medium, may be considerably lower than with binary mixtures with a high vapor pressure of the working medium, for example with aqueous ammonia solution. In an absorption machine working with a binary mixture according to the invention, the thermal losses in connection with the admixture of neutral gas can, therefore, be considerably reduced.

It is advisable to keep the admixture of neutral gas within narrow limits and, for example, not to increase the total pressure in the evaporator beyond half the condensing pressure. In order to avoid reactions of the gas with the hydrocarbons of the absorption solution, it is advisable to use argon as a neutral gas.

In the drawing an example for carrying out the invention is schematically illustrated.

The example refers to an absorption refrigerating machine with neutral gas admixed to the vapor of the working medium in the absorber and the evaporator.

The numeral 1 indicates the generator heated by means of an electric heating element 2, 3 is a narrow pipe in which absorption solution (a binary mixture of toluene and paraffin oil) rises together with liberated bubbles (toluene vapor) into a gas separation chamber 4 disposed at a higher level. Here the gas and the solution separate. While the gas passes through the pipe 7 to the condenser 8 forming a part of a U-shaped pipe, where it is liquefied, the weak absorption solution flows through a liquid pipe 5, bent into a wide U-shape, to the top of the absorber 6. From here a pipe 12, forming a heat exchanger with the pipe 5, conveys the absorption solution, now again enriched, back to the generator 1. The evaporator 9, into which the operating medium liquefied in condenser 8, is discharged at the top, is connected with the absorber 6 by wide pipes 10, 11 in such a manner as to form a gas mixture circulation system. This circuit, including the vessels 6, 9, contains a neutral gas, for example argon, admixed to the toluene vapor, to equalize a part of the difference between the condensing pressure and the evaporating pressure of the toluene. The quantity of this neutral gas is so chosen as to equalize only the smaller part of the said difference of pressure, the greater part remains and is maintained by a column of liquid toluene, contained in the upwardly extending leg of the U-shaped pipe leading to the evaporator 9, and of which the condenser 8 forms a part.

In general, the described absorption refrigerating machine operates in the known manner. Through the evaporation of the liquefied toluene in the evaporator 9, cold is produced. The heat freed in the condenser 8 and in the absorber 6 is carried off by suitable cooling means, for instance, air.

I claim as my invention:

1. A continuous absorption refrigerating machine containing an absorption liquor composed of toluene and paraffin oil, and comprising a generator, a condenser, an evaporator and an absorber, a neutral gas admixed to the toluene vapor in the evaporator and absorber; gas and liquid pipes connecting said vessels with one another to make possible a circulation of the toluene through the generator, condenser, evaporator and absorber, a circulation of absorption liquor through the generator and absorber and a circulation of the neutral gas through the evaporator and absorber, said neutral gas being admixed only in such a quantity as to compensate only a small part of the difference between the condensing pressure and evaporating pressure of the toluene; and a liquid column consisting of liquefied toluene in the connecting pipe between the condenser and the evaporator and serving to maintain the remaining larger part of said pressure difference.

2. A continuous absorption refrigerating machine containing an absorption liquid composed of toluene and paraffin oil, and comprising vessels constituting a generator, a condenser, an evaporator, and an absorber, and conduits connecting said vessels with one another and adapted to convey the toluene through the generator, condenser, evaporator and absorber, and adapted to circulate said absorption liquor through the generator and absorber, said conduits and said vessels being so arranged as to cause the formation of a liquid column of liquefied toluene in the conduit connecting the condenser and the evaporator, said liquid column serving to maintain a difference in pressure between said condenser and said evaporator.

In testimony whereof I affix my signature.

EDMUND ALTENKIRCH.